United States Patent Office 2,949,974
Patented Aug. 23, 1960

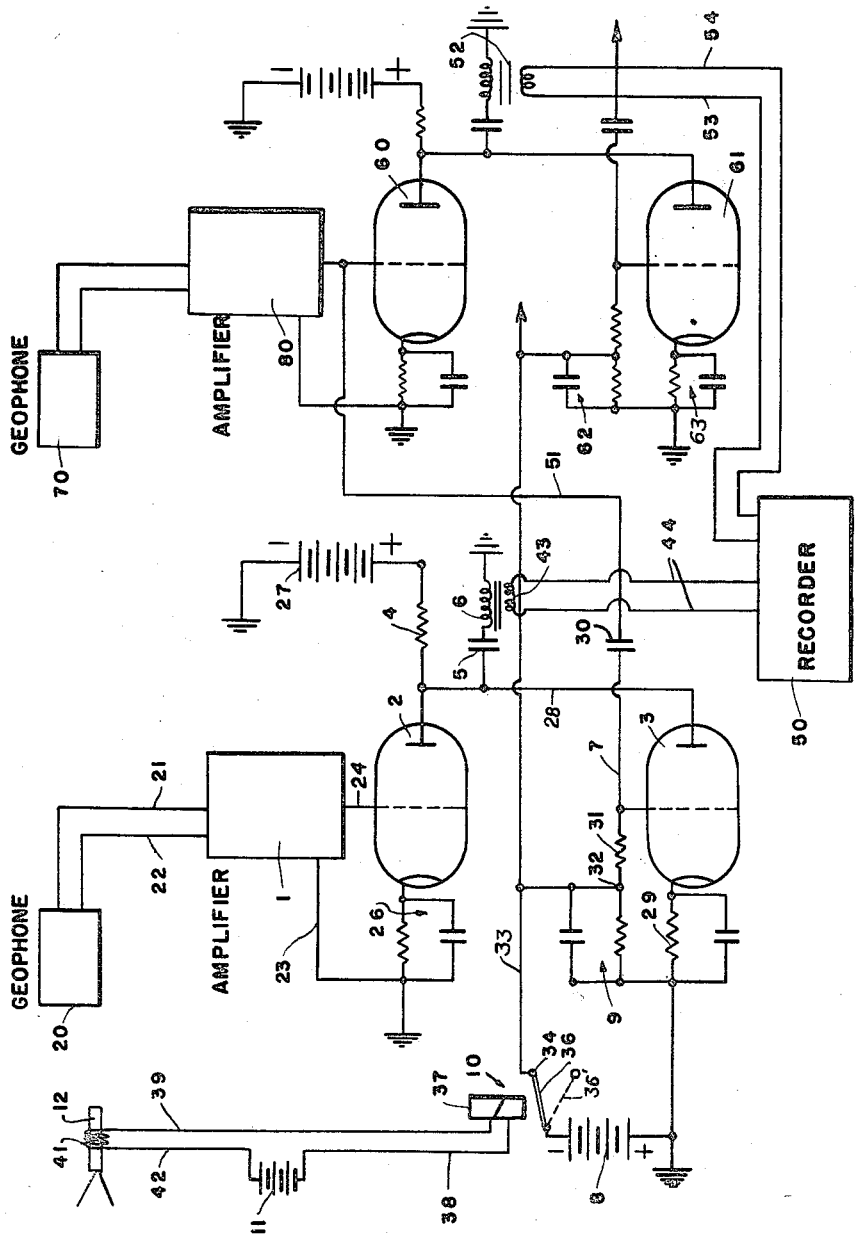

2,949,974
SEISMIC EXPLORATION APPARATUS

Wilhelm Beuermann, Hannover, Germany, assignor to Seismos G.m.b.H., Hannover, Germany Filed Oct. 26, 1955, Ser. No. 542,986

4 Claims. (Cl. 181—.5)

The present invention relates to a new and improved apparatus for seismic exploration. More particularly, the present invention relates to a new and improved apparatus for locating deposits in the earth by means of seismic waves wherein a plurality of geophones is used.

In order to investigate the earth's surface and the various layers of the earth lying beneath the surface, artificial explosions are set off in the region of the earth's surface under investigation in order to produce seismic waves therein. These seismic waves are reflected from the various layers of the earth and are detected by geophones which are established in a predetermined relationship with respect to the place where the explosion is set off.

The first waves to reach the geophones are those which have been reflected from the upper surface of the earth and the layers thereof near the surface. As is well known, each geophone converts the seismic waves detected by it into a voltage impulse proportional to the amplitude thereof. Each voltage impulse is recorded and the plurality of recorded impulses form the seismogram which reveals to the experienced observer the various formations in the region of the earth under investigation.

The first recorded impulses which are due to the seismic waves reflected from those layers of the earth near the surface are naturally the largest of the impulses recorded since the remaining impulses are due to seismic waves which have to travel a greater distance before being reflected by a discontinuity of the earth's structure. These first voltage impulses are called the "first registration."

It is relatively simple to differentiate between the different levels of those impulses recorded in the "first registration" because of the relatively large amplitude thereof. However, those impulses which are due to seismic waves reflected from lower sub-surface layers of the earth are subject to fluctuations resulting from irregularities of the make-up of the earth's upper crust. In order to eliminate these fluctuations from the impulses corresponding to the seismic waves arriving at the geophones in the later time period, it is conventional practice to mix together the impulses arriving at adjacent geophones. However, this mixing together of the impulses of adjacent geophones has several disadvantages.

The first disadvantage is the false recording of the impulses corresponding to the "first registration." That is, the first seismic waves reaching the geophones are not properly recorded since the seismic wave reaching the geophone closest to its point of reflection will produce a voltage impulse therein which may be directly transmitted to the next adjacent geophone. Accordingly, the recording of the next adjacent geophone will not be due to the seismic wave arriving at this geophone, but rather will be due to the voltage impulse coming from the preceding geophone.

In order to overcome this disadvantage, it is common practice to set off a plurality of separate explosions wherein the outputs of the adjacent geophones are not mixed at all. Subsequently, explosions are set off and voltage impulses recorded wherein the impulses of adjacent geophones are mixed. The two sets of records for the individual explosions must then be compared in order to determine which of the recordings are due to the seismic waves and which are due to the action of the mixing of the voltage impulses.

A further disadvantage of the mixing methods used by conventional apparatus is in the false recording of a series of impulses which correspond to seismic waves reflected from layers which are close to the earth's surface. These reflected waves do not reach two adjacent geophones simultaneously, but rather at different times. Therefore, the voltage impulses due to the same reflected seismic waves are shifted in phase with respect to each other. Accordingly, when these phase shifted impulses are mixed together to be added, it is apparent that some portion of the amplitude of the resulting mixed impulse is eliminated.

The present invention overcomes the disadvantages of the prior art methods and apparatus by recording the voltage impulses corresponding to the "first registration" from each geophone independently from the impulses of the other geophones. However, after the "first registration" has been recorded, the voltage impulses corresponding to seismic waves arriving during a later time interval are recorded in such manner that the voltage impulses of adjacent geophones are mixed together.

It is accordingly an object of the present invention to provide a new and improved apparatus for overcoming the above-described disadvantages.

A second object of the present invention is to provide a new and improved apparatus for seismic exploration of the earth's surface.

Another object of the present invention is to provide a new and improved apparatus for recording voltage impulses due to seismic waves.

A further object of the present invention is to provide a new and improved apparatus for seismic explorations of the earth's surface wherein voltage impulses corresponding to the first occurring seismic waves are recorded in independent fashion while subsequently occurring voltage impulses are mixed together before being recorded.

Yet another object of the present invention is to provide a new and improved apparatus for recording seismic waves having mixing apparatus which is inactivated for a predetermined time interval.

With the above objects in view, the present invention mainly consists of a new and improved apparatus for use in a method of seismic exploration of the strata of the earth occurring at different distances from the earth's surface including the steps of producing an emission of a seismic wave from each of said strata different in characteristics from and occurring at a different time from any of the other seismic waves emitted by the other strata, receiving the emitted seismic waves at a plurality of points spaced from each other, separately recording at least one of the waves thus simultaneously received at the receiving points, and additively recording the remainder of the waves thus simultaneously received at the receiving points.

In one embodiment of the present invention used for the seismic exploration of the strata of the earth occurring at different distances from the earth's surface, the present invention includes means for producing an emission of a seismic wave from each of the strata different in characteristics from and occurring at a different time from any of the other seismic waves emitted by the other strata, means for receiving the emitted seismic waves at a plurality of points spaced from each other, and recording means for separately recording at least one of the waves thus simultaneously received at the receiving points and additively recording the remainder of the waves thus simultaneously received at the receiving points.

As another feature of the present invention an amplifier tube is used for mixing impulses arriving from the adjacent geophones and the amplifier is maintained in inoperative condition for a predetermined time period.

As another feature of the present invention the mixing apparatus for voltage impulses of adjacent geophones is rendered operative after a predetermined time period depending upon the time constant of the mixing circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

The single figure is an electrical schematic diagram of one embodiment of the present invention.

Referring to the drawing, a geophone 20 is shown in block form. The geophone is placed in a predetermined position with respect to the position where the blast is to be set off. The geophone 20 receives arriving seismic waves and converts the same into respective voltage impulses proportional to the amplitude of the corresponding seismic wave.

The voltage impulses produced in the geophone 20 are applied by conductors 21 and 22 to the input of an amplifier 1. The amplifier 1 has a first output terminal connected to ground potential by a conductor 23 and a second output terminal directly connected by conductor 24 to the control electrode of a power tube 2. The cathode of the tube 2 is connected to ground by means of the parallel combination 26 of a capacitor and a resistor and the anode thereof is connected to the positive terminal of a source of operating potential 27 through an anode resistor 4. The other terminal of the source 27 is connected directly to ground.

The anode of the tube 2 is also connected to one terminal of an output transformer 6 through a capacitor 5 and is directly connected by a conductor 28 to the anode of an amplifier tube 3. The cathode of the tube 3 is connected to ground by means of the parallel combination 29 of a resistor and a capacitor.

The control electrode of the tube 3 is connected to ground by means of a resistor 31 in series with the parallel combination 9 of a resistor and capacitor. The junction point 32 between the resistor 31 and the combination 9 is connected by a conductor 33 to a normally open contact 34 of a relay 10. The relay 10 has a movable armature 36 which is connected to the negative terminal of a source of direct current potential 8, the positive terminal of which is connected to ground.

The relay 10 has an energizing coil 37 one side of which is connected by a conductor 38 to one terminal of a source of direct current potential 11, and the other side of which is connected to the other side of the source 11 by a conductor 39, a coil 41 and a conductor 42. The coil 41 consists of a few turns of wire wound about a detonator 12 which is to be used for setting off the artificial blast.

The remaining connections of the electrical circuit of the drawing includes the connection of the control electrode of the tube 3 by conductor 7 to one side of a capacitor 30. The other side of the capacitor 30 is connected by a conductor 51 to the control electrode of an output tube 60 of a second geophone amplifier combination.

This second combination includes a geophone 70 and an amplifier 80 which correspond respectively to the geophone 20, conductors 21 and 22, and the amplifier 1. However, the geophone 70 is located at a different position with respect to the site of the blast with respect to the geophone 20. Accordingly, the geophone 70 is adjacent to the geophone 20, that is, of the plurality of geophones, the geophone 70 is the closest to the geophone 20. Accordingly, the seismic wave which is received by the geophone 20 and converted into a voltage impulse is also received by the geophone 70 at substantially the same time.

Therefore, the seismic wave which is simultaneously received by the geophone 70 will also be converted into a voltage impulse and amplified in its respective amplifier 80.

The output of the amplifier 80 is applied to the control electrode of the tube 60 and from the anode of the tube 60 it is applied to the output transformer 52. The output from the anode of tube 60 is also applied to the anode of a second mixing tube 61 which provides the same function for the geophone 70 and amplifier 80 as the tube 3 for the geophone 20 and the amplifier 1. The tube 61 has a parallel combination 62 of a capacitor and a resistor connected between its control electrode and ground and a similar parallel combination 63 connected between its cathode and ground.

The output transformer 6 has its remaining terminal connected to ground and includes an output winding 43. The output winding 43 is connected on conductors 44 to a recorder 50. In operation, the seismic waves arriving at the geophone 20 produce corresponding voltage impulses which are transmitted to the amplifier 1 by conductors 21 and 22. In the amplifier 1 the voltage impulses are amplified and the amplified output impulses are applied to the control electrode of the output tube 2. These amplified output impulses are taken from the anode of the tube 2 and applied to the output transformer 6 through the blocking capacitor 5. The output impulses are taken from the output winding 43 of the output transformer 6 and are transmitted to the recorder 50. The recorder 50 is a conventional recording instrument and accordingly is shown only in block form. The recorder 50 may, for example, be the type wherein an inked trace is made on a moving roll of paper and wherein the pen making the ink trace is deflected by the applied voltage impulses. It can be seen that the recorder 50 can also be connected by conductors 53 and 54 to the output winding of the transformer of the geophone 70.

It can be seen that the output transformer 6 is common to both the anode circuits of the tubes 2 and 3. Accordingly, if the tube 3 is in conductive condition, any voltage impulses arriving from the amplifier 80 will be applied to the control electrode thereof and will also appear in the output transformer 6. Accordingly, if it is desired to additively mix the outputs of the geophone 20 and a geophone adjacent thereto, the voltage impulses from the adjacent geophone 70 are applied through the capacitor 30. Similarly, if it is desired to mix the outputs of the geophone 70 with its next adjacent geophone, the output of the next adjacent geophone is applied to the control electrode of the tube 61.

As indicated hereinabove the early arriving impulses, which correspond to the seismic waves reflected from the strata of the earth near the outer surface thereof, should be recorded independently for each of the geophones generating the same.

In accordance with the principles of the present invention, the apparatus shown in the drawing prevents the additive mixing of the earlier arriving impulses in the following manner:

The detonator 12 which sets off the blast which produces the seismic waves has the coil of wire 41 wound thereabout. This coil of wire permits the coil 37 of the relay 10 to be energized by the source 11 of direct current potential. When the coil 37 is energized, it attracts its armature 36 and moves this armature into electrical contact with the normally open contact 34. In this position the negative bias potential supplied by the source 8 of direct current potential is applied by the conductor 33 to the control electrode of the tube 3 and the control electrode of the tube 61. The potential supplied by the source 8 is sufficient to block conduction in the tubes 3 and 61 even if positive voltage impulses from the adjacent geophones are applied to the control electrodes of the tubes 3 and 61. At the same time, the capacitors in the parallel combinations of resistor and capacitor 9 and 62 respectively, are charged.

When the detonator 12 sets off the blast the coil of the wire 41 is destroyed, thereby opening the circuit between the source 11 and the relay coil 37. Accordingly, the coil 37 will no longer attract the armature 36 thereto and this armature will be returned to its initial position shown by the dotted line 36', by a return spring not shown. This will remove the negative biasing potential applied by the source 8 from the control electrodes of the tubes 3 and 61. However, the charged capacitors in the parallel combinations of resistor and capacitor 9 and 62 will still maintain the tubes 3 and 61 in blocked or non-conductive condition until the respective capacitor discharges through the resistor connected in parallel therewith. This discharge time of the capacitor will depend upon the RC time constant of the parallel combinations 9 and 62.

Accordingly, for a predetermined time interval, after the setting off of the blast, depending on the RC time constants, the tubes 3 and 61 will be maintained in blocked condition. Therefore, any voltage impulses applied to the control electrodes of the tubes 3 and 61 will not be additively mixed in the output transformers 6 and 52, respectively. During this time interval all the seismic waves reaching the geophones 20 and 70 will be converted into voltage impulses which are amplified in the amplifiers 1 and 80, respectively, and separately recorded in the recorder 50 independent of any other voltage impulses produced in any other geophone.

However, once the capacitors in the parallel combinations 9 and 62, respectively, have been fully discharged, the negative bias potential applied to the control electrodes of the tubes 3 and 61 will be removed and all the voltage impulses applied to the control electrodes of the tubes 3 and 61 thereafter will be additively mixed with the voltage impulses produced by the geophones 20 and 70, respectively. These mixed impulses, each of which corresponds to the superposition of one pair of voltage impulses produced by separate geophones, will be recorded on the recorder 50.

Therefore, at the end of the recording operation, each geophone will have a recorded trace, the earlier recordation of which will correspond to seismic waves arriving closer to the time of the setting off of the blast and the remaining portion of which will correspond to seismic waves arriving thereafter. The first recorded voltage impulses of the trace will correspond to the "first registration" and will be separately recorded as it is produced by the individual geophone. The subsequent recorded impulses will correspond to additively mixed impulses of adjacent geophones and accordingly it will compensate for fluctuations in the composition of the earth not due to the different strata thereof.

It is apparent that the relay 10 of Fig. 1 may be energized by the source 11 through a separate switching circuit which may be manually operated so that any desired operation of the recorded trace could represent either additively mixed or separate voltage impulses. Similarly, other types of switching apparatus may be used which are set off by the blast itself such as a pressure transducer.

The apparatus as used for seismic exploration will normally include a plurality of geophones which are oriented in a predetermined pattern with respect to the site of the blast. Since there are a plurality of geophones, each seismic wave reaching the geophones will have a plurality of voltage impulses corresponding thereto. The voltage impulses of adjacent geophones will be additively mixed and recorded or separately recorded depending upon the condition of the respective mixing and amplifying tubes. It is clear that one relay 10 may be used for a plurality of geophone circuits so that each of these circuits will be simultaneously operated by the same relay.

It will be understood that each of the elements described above, or two or more together, may also find a useful application in other types of electronic mixing apparatus differing from the types described above.

While the invention has been illustrated and described as embodied in an apparatus for seismic exploration, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for seismic exploration of the strata of the earth occurring at different distances from the earth's surface comprising, in combination, means for producing an emission of a seismic wave from each of said strata different in characteristics from and occurring at a different time from any of the other seismic waves emitted by the other strata; a plurality of geophones for receiving said emitted seismic waves at a plurality of points spaced from each other and for converting each of said received seismic waves into a respective voltage impulse at each receiving station; a plurality of amplifiers, each of said amplifiers being responsive to the voltage impulses emitted from one of said geophones, respectively, and for emitting an amplified output impulse for each of said voltage impulses to which it responds, each of said amplifiers having an output, respectively; a plurality of recorders, each of said recorders being connected in circuit with the output of one of said amplifiers, respectively, for separately recording the output of the same; a plurality of mixing circuits, each of said mixing circuits including at least one electron discharge device having at least an anode, a cathode and a control electrode, said anode of each of said devices being connected respectively to the output of one of said amplifiers and said control electrode being connected respectively to the output of at least another of said amplifiers; and blocking means for applying a blocking negative biasing potential to the control electrode of each of said electron discharge devices to a varying degree for a predetermined time and for progressively and steplessly decreasing the amplitude of said negative biasing potential to initiate conduction in said electron discharge devices in accordance with the varying degree of the negative biasing effect of said blocking means.

2. Apparatus for seismic exploration of the strata of the earth occurring at different distances from the earth's surface comprising, in combination, means for producing an emission of a seismic wave from each of said strata different in characteristics from and occurring at a different time from any of the other seismic waves emitted by the other strata; a plurality of geophones for receiving said emitted seismic waves at a plurality of points spaced from each other and for converting each of said received seismic waves into a respective voltage impulse at each receiving station; a plurality of amplifiers, each of said amplifiers being responsive to the voltage impulses emitted from one of said geophones, respectively, and for emitting an amplified output impulse for each of said voltage impulses to which it responds, each of said amplifiers having an output, respectively; a plurality of recorders, each of said recorders being connected in circuit with the output of one of said amplifiers, respectively, for separately recording the output of the same; and a plurality of mixing circuits, each of said mixing circuits including at least one electron discharge device having at least an anode, a cathode and a control electrode, said anode of each of said devices being connected respectively to the output of one of said amplifiers and said control electrode being connected respectively to the output of at least another of said amplifiers, and a parallel combination of a resistor and a capacitor connected between said control electrode of each of said electron discharge devices, respectively, and the cathode thereof, said capacitor being capable of being charged for blocking conduction through the connected discharge device for a time defined by the RC constant of said combination.

3. Apparatus for seismic exploration of the strata of the earth occurring at different distances from the earth's surface comprising, in combination, means for producing an emission of a seismic wave from each of said strata different in characteristics from and occurring at a different time from any of the other seismic waves emitted by the other strata; a plurality of geophones for receiving said emitted seismic waves at a plurality of points spaced from each other and for converting each of said received seismic waves into a respective voltage impulse at each receiving station; a plurality of amplifiers, each of said amplifiers being responsive to the voltage impulses emitted from one of said geophones, respectively, and for emitting an amplified output impulse for each of said voltage impulses to which it responds, each of said amplifiers having an output, respectively; a plurality of recorders, each of said recorders being connected in circuit with the output of one of said amplifiers, respectively, for separately recording the output of the same; a plurality of mixing circuits, each of said mixing circuits including at least one electron discharge device having at least an anode, a cathode and a control electrode, said anode of each of said devices being connected respectively to the output of one of said amplifiers and said control electrode being connected respectively to the output of at least another of said amplifiers, and a parallel combination of a resistor and a capacitor connected between said control electrode of each of said electron discharge devices, respectively, and the cathode thereof; and means for applying a blocking negative biasing potential to the control electrodes and said parallel combinations of each of said electron discharge devices, whenever desired to charge said capacitors of each of said parallel combinations, thereby blocking conduction through said electron discharge devices, conduction through said electron discharge devices being progressively initiated by the discharge of said capacitors through their respective parallel connected resistors.

4. Apparatus as set forth in claim 3, wherein said means for applying a blocking negative biasing potential include a source of electric energy and a relay operated switch in circuit with said combination of a resistor and a capacitor, and wherein said means for producing an emission of a seismic wave include an electric circuit comprising a source of electric energy and the energizing coil of said relay switch so that when said means for producing an emission of seismic wave are actuated, said relay becomes energized.

References Cited in the file of this patent

UNITED STATES PATENTS

| | | |
|---|---|---|
| 2,059,018 | North | Oct. 27, 1936 |
| 2,180,949 | Blau et al. | Nov. 21, 1939 |
| 2,266,041 | Hoover | Dec. 16, 1941 |
| 2,348,409 | Parr | May 9, 1944 |
| 2,578,133 | Hawkins | Dec. 11, 1951 |
| 2,662,126 | Henson | Dec. 8, 1953 |